Aug. 11, 1964   L. LOMBARDI   3,144,067
VEHICLE TRACTION DEVICE
Filed July 24, 1963   2 Sheets-Sheet 1
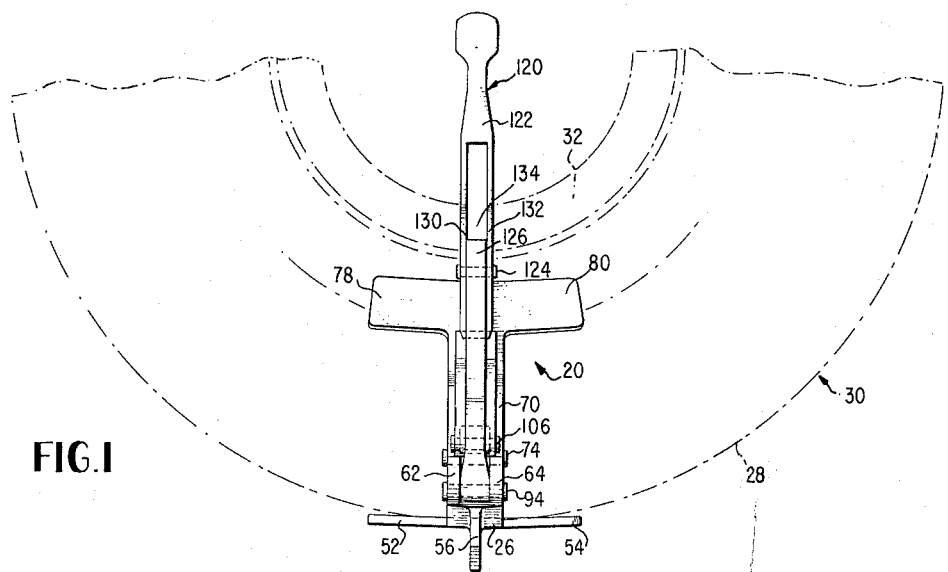
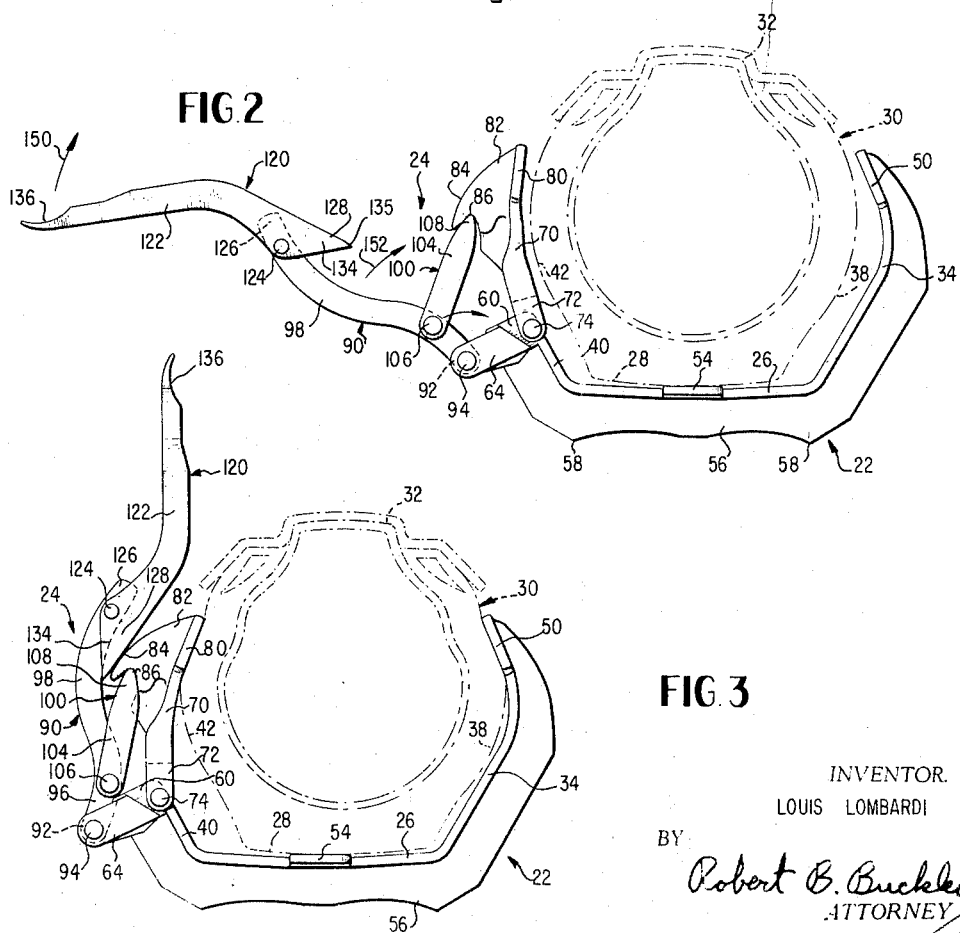
INVENTOR.
LOUIS LOMBARDI
BY
*Robert B. Buckley*
ATTORNEY Aug. 11, 1964

L. LOMBARDI 3,144,067

VEHICLE TRACTION DEVICE

Filed July 24, 1963

INVENTOR.
LOUIS LOMBARDI

Robert B. Buckley
ATTORNEY

United States Patent Office 3,144,067
Patented Aug. 11, 1964

3,144,067
VEHICLE TRACTION DEVICE
Louis Lombardi, 62 Tilt St., Haledon, Paterson 2, N.J.
Filed July 24, 1963, Ser. No. 297,453
7 Claims. (Cl. 152—228)

This invention relates to a traction device for use on vehicles. More particularly, this invention provides a device for readily and conveniently improving the traction of a vehicle when the roadway or terrain being travelled is such as to reduce traction, as when it is covered with snow, ice, mud, or the like.

The present invention resides in the concept of a traction device for vehicles that can be readily mounted on, and detached from, the wheels of a vehicle to improve the traction thereof. The traction device can be applied without jacking up the vehicle. The traction device of the invention is formed with elements for clamping the sidewalls of a resilient pneumatic tire of a wheel and somewhat compressing the tire widthwise.

The traction device is constructed so that the compressed tire, by its resiliency, exerts, reactively, a thrust tending to maintain the traction device securely clamped on the tire. When it is desired to remove the traction device from the tire, a simple manual motion will manipulate the elements to disengage the traction device from the tire.

For a better understanding of the invention and its other objects, advantages and details, reference is now made to the presently preferred embodiment of the invention which is shown, for purposes of illustration only, in the accompanying drawings.

In the drawings:

FIGURE 1 is an elevation of a traction device according to the invention, viewed from the outer side of the tire and wheel, and showing the tire and wheel, on which it is mounted, in phantom lines;

FIGURE 2 is an end elevational view of the traction device shown in FIGURE 1, shown in its open position and initially placed on a tire and wheel shown in section in phantom lines, with arrows indicating the movement of the parts toward closed position;

FIGURE 3 is a view similar to FIGURE 2 and showing the traction device in its closed position on the tire where it clamps and somewhat compresses the tire widthwise;

Figure 4:
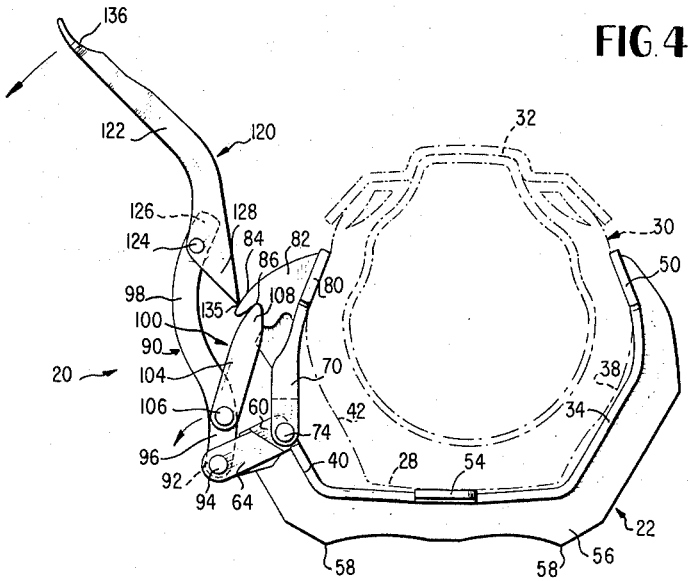
FIGURE 4 is an end elevational view of the traction device at an intermediate position in the disengaging or dismounting operation showing the linkage elements moving toward the open position as indicated by the arrows.

Briefly stated, the traction device shown in the drawings includes a main portion for engaging the tread of the tire and the inner sidewall of the tire, and elements pivotally-connected to said main portion for engaging and compressing the outer sidewall of the tire.

The main portion includes a base engageable with the tread portion of the tire and an inner limb formed integrally with one end of the base and extending angularly thereto for engagement with the inner sidewall of a tire. For engaging the roadway or terrain, a cleat is formed extending outwardly from the outer surface of the base.

A butt is formed integrally with the other end of the base and extends angularly thereto. When the device is in closed position on a tire, the butt extends adjacent the radially-outer portion of the outer sidewall of the tire. A stud is formed integrally with the upper end of the butt for connection of the pivotal elements.

The pivotally-connected elements include an outer limb pivotally connected to the stud and engageable with the outer sidewall of the tire. The pivotally-connected elements further include a manually-operable linkage for releasably pivoting the outer limb to a position engaging the outer sidewall of the tire, where the traction device is in the closed or tire-clamping position. The parts and elements of the device are so proportioned and dimensioned with respect to the dimensions of the tire upon which it is to be mounted that, at said closed position, the distance between the tire-engaging surfaces of the inner and outer limbs is somewhat less than the uncompressed width of the tire at the points of engagement. Thereby, the traction device, at this closed position, somewhat compresses the tire widthwise.

For moving the device between open and closed positions, a link is pivotally connected to the stud and extends outwardly therefrom. A locking bar has its proximal end pivotally connected to said link at a position spaced from the pivotal connection of the link to the stud. The locking bar is formed with a nose at its distal end for removable reception in a notch formed in a lug or stop formed on the outer surface of the outer limb.

A manually-operable lever is pivotally connected, intermediate its ends, to the distal end of the link. The lever has a manually-engageable arm on one side of its pivot and a camming arm on the other side of its pivot. The camming arm is engageable with the lug formed on the outer limb to produce a fulcrum for dismounting the traction device from the tire.

When the traction device is on the tire, in closed position, the compressed tire, by its resiliency, exerts a torque, that is transmitted through the lug and locking bar to exert a torque on the link tending to maintain the linkage in closed position. This occurs, because, at closed position, the axis of the pivotal connection of the locking bar to the link is located inwardly, or towards the tire, from an imaginary line or plane connecting the point or line of pivoting engagement of the lug and locking bar nose with the axis of the pivotal connection of the link to the stud.

When the manually-engageable arm of the lever is pulled outwardly, the linkage is pivoted so as to move the linkage to open position where the axis of the pivotal connection of the locking bar to the link is located outwardly, or away from the tire, from the imaginary line or plane connecting the point or line of pivoting contact of the lug and locking bar nose with the axis of the pivotal connection of the link to the stud.

Figure 5:
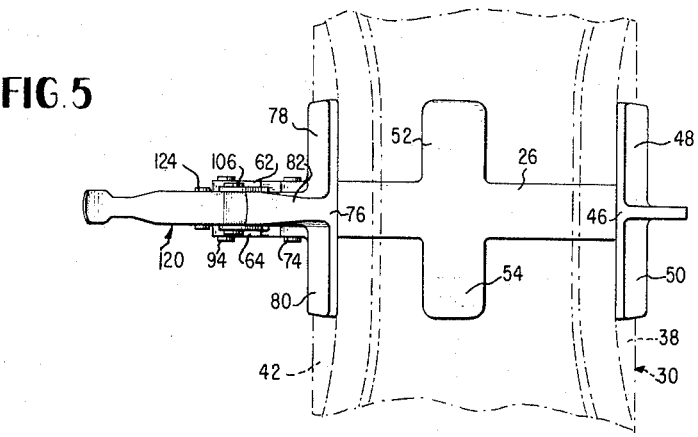
FIGURE 5 is a top plan view of the traction device at a position intermediate the open and closed positions, and showing a portion of the tire in phantom lines.
Figure 6:
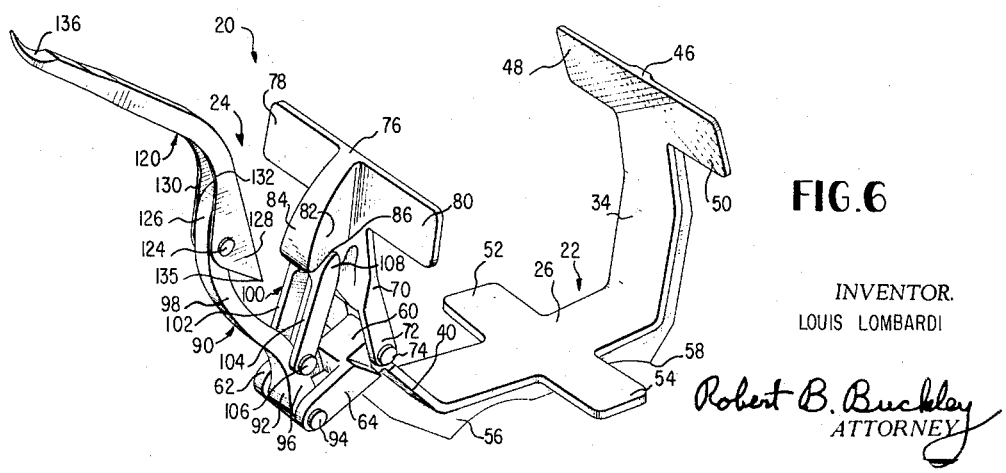
FIGURE 6 is a perspective view of the traction device, that is illustrated in the previous figures, shown alone without the tire.

There now follows a specific description of the embodiment of the invention illustrated in the drawings. The traction device generally indicated by the numeral 20 is shown in perspective in FIGURE 6 and is movable between the closed position shown in FIGURES 1 and 3 through intermediate position shown in FIGURES 4 and 5 and the open position shown in FIGURE 2.

The traction device 20 includes a main portion generally indicated by the numeral 22 and elements pivotally-connected thereto generally indicated by the numeral 24. The main portion 22 includes a base 26 engageable with the tread 28 of a tire 30 mounted on a wheel frame 32. The main portion 22 further includes an inner limb 34 formed integrally with the base 26 and curved so as to embrace the curved inner sidewall 38 of the tire 30. A butt 40 is formed integrally at the outer end of base 26 and extends adjacent the radially-outer portion of the outer sidewall 42 of the tire 30. The inner limb 34 and the butt 40 extend angularly to the base 26.

For stabilizing and improving the contact of the traction device 20 with the tire 30, the inner limb 34, has, at its distal or free end 46, a pair of oppositely-extending wings 48 and 50, grooved on their inner surfaces so as to improve frictional gripping of the tire sidewall 38. For the same stabilizing purpose, the base 26 has a pair of tabs 52 and 54 extending oppositely from its sides.

For engaging the ice, snow, mud or the like of the roadway or terrain, a cleat 56 is formed integrally on the base, inner limb and butt, and extends perpendicularly outwardly therefrom. The cleat 56 is formed with points 58 on its lower edge.

For providing pivotal mounting for the linkage elements, a stud 60 is integrally joined to the upper end of butt 40, and is bifurcated with two spaced legs 62 and 64 extending obliquely downwardly and sidewardly.

The elements 24, pivotally connected to main portion 22, include an outer limb 70 for engaging the outer sidewall 42 of the tire. The outer limb 70 has it proximal end 72 pivotally-connected by pin 74 to the inner end of stud 60. The distal end 76 of outer limb 70 is formed integrally with a pair of oppositely-extending wings 78 and 80 for engaging the outer sidewall 42 of tire 30 and providing stabilizing and clamping action. The distal end 76 of the outer limb 70 has formed, on its outer surface, a stop or lug 82 having an arcuate shoulder 84. A notch 86 is formed in the lower surface of lug 82.

The linkage elements, for moving the traction device between open and closed positions, including a link 90 of general S-shape having its proximal end 92 pivotally positioned between stud legs 62 and 64 by pivot pin 94. The link 90 includes a proximal portion 96 adjacent its pivot pin 94 and a distal portion 98 curved outwardly away from outer limb 70. A locking bar 100 is bifurcated with legs 102 and 104 having their proximal ends received on opposite sides of the link 90 and pivotally connected thereto by a pin 106 at a position somewhat spaced from the pivot pin 94 and at about the juncture of the distal portion 98 and the proximal portion 96 of the link 90.

For engaging the outer limb 70 and moving it to closed position, the locking bar 100 has, at its distal end, a nose 108 formed with converging surfaces for mating engagement with the surfaces of notch 86 of lug 82.

A manually-operable lever 120 moves the device 20 between its open and closed positions. The lever 120 includes a manually-engageable arm 122 on one side of its pivot pin 124 that is rotatably received in the distal end 126 of link 90; and a camming arm 128 on the opposite side of pivot pin 124. In the vicinity of the pivot pin 124, the lever 120 has a U-shaped cross-section including side panels 130 and 132, and fin 134 joining the opposed edges of the side panels 130 and 132. The camming arm 128 has a tip 135 and is adapted to engage shoulder 84 of lug 82.

The distal end of manually-engageable arm 122 is formed with an indentation 136 for finger-engagement in operation of the device.

The operation of the embodiment disclosed in the drawings will now be described. The traction device 20 is moved to its open position by pulling outwardly on manually-engageable lever arm 122. The device 20 is then placed on tire 30, where the parts are at approximately the position shown in FIGURE 2. At this position, the axis of pivot pin 106, connecting the proximal end of locking bar 100 to link 90, is located at a position outwardly, or away from outer limb 70 and tire 30, from an imaginary line or plane connecting the axis of pivot pin 94 that connects link 90 to stud 60, and the point or line of pivoting engagement of the tip of nose 108 with the notch 86.

Then, the lever arm 120 is rotated clockwise, in the direction of the arrow 150 shown in FIGURE 2, so that the camming arm 128 engages the link 90 and, with continued rotation, causes rotation of link 90 in the direction of the arrow 152 as shown in FIGURE 2. The nose 108 of locking bar 100 enters notch 86 and pivots the outer limb 70 into engagement with outer sidewall 42 of tire 30.

The linkage elements pass, in clockwise rotation, through a dead-center position, approximately illustrated in FIGURE 4, where the axis of pivot pin 106 is coplanar with the axis of pivot pin 94 and the point or line of pivoting engagement of the tip of nose 108 with the notch 86. The linkage continues to move in a clockwise direction to the closed position, illustrated in FIGURE 3, wherein the traction device 20 is securely clamped on the tire 30.

At this position, the axis of pivot pin 106 is located inwardly, or toward the outer limb 70 and tire 30, from an imaginary line or plane connecting the axis of pivot pin 94 with the point or line of pivoting engagement of the tip of nose 108 with notch 86. In this position, the tire 30, being somewhat compressed widthwise, exerts, by its resiliency, a thrust transmitted outwardly through outer limb 70, lug 82, and locking bar 100, to link 90. This thrust tends to rotate link 90 in a clockwise direction as seen in FIGURE 3, and thus maintains the device in its closed position, clamping the tire, and resisting undesired or inadvertent disengagement of the device 20 from the tire 30.

To disengage or dismount the device 20 from the tire 30, the manually-engageable lever arm 122 is rotated counterclockwise, as seen in FIGURES 3 and 4, so that camming arm 128 pivots about a fulcrum formed by the engagement of its tip 135 with shoulder 84 of lug 82. Thus the linkage is rotated counterclockwise through the dead-center position approximately illustrated in FIGURE 4, to the open position of FIGURE 2. Then the device 20 can be easily removed from the tire 30.

Thus it will be seen that the invention provides a traction device that is readily mounted on and detached from a vehicle wheel and tire so as to provide increase of traction where necessary in accordance with road conditions.

While a presently preferred embodiment of the invention has been illustrated and described, it will be recognized that the invention can be otherwise variously embodied and practiced within the scope of the following claims.

I claim:

1. A traction device for easy mounting on, and detachment from, a wheel having a tire with a tread portion and two sidewalls, said traction device comprising a main portion and elements pivotally connected to said main portion, said main portion having surfaces engageable with the tread and one sidewall of a tire, said pivotally-connected elements including means engageable with the other sidewall of a tire and pivotally-connected to said main portion, a link pivotally-connected to said main portion, locking means pivotally-connected to said link, said pivotally-connected tire-wall-engaging means having stop means thereon for engaging one end of said locking means; said main portion and said pivotally-connected elements being so proportioned and dimensioned that said traction device is movable to an open position in which the device is placed on a tire with said main portion engaging one sidewall and the tread of the tire, said pivotal connection of said locking means to said link being located, at said open position, at a position outwardly from an imaginary line connecting the point of engagement of said stop means and said locking means with the axis of said pivotal connection of said link and said main portion, said link is pivotable inwardly whereby said locking means, by its engagement with said stop means, pivots said pivotally-connected tire-wall-engaging means inwardly to move said traction device to a tire-clamping closed position where said pivotal connection of said locking means to said link is located at a position inwardly from an imaginary line connecting the point of engagement of said stop means and said locking means with the axis of said pivotal connection of said link and said main portion, the distance between the tire-clamping surfaces of said device, at said closed position, being less than the uncompressed width of the tire at their points of engagement therewith, said tire being compressed, and, by its resiliency, reactively exerting an outward thrust that is transmitted through said locking means to said link to exert a torque on said link tending to move said link and said traction device to closed position and resisting movement of said device to open position, and said device is movable from closed position to open position by an outward pivoting of said link.

2. A traction device for easy mounting on, and detachment from, a wheel having a tire with a tread portion and two sidewalls, said traction device comprising a main portion and elements pivotally-connected to said main portion, said main portion having surfaces engageable with the tread of a tire, the inner sidewall of the tire, and the road supporting the tire; said pivotally-connected elements including a limb pivotally-connected to said main portion and engageable with the outer sidewall of the tire, a link pivotally-connected to said main portion, a locking bar pivotally-connected to said link, said limb having stop means thereon for engaging one end of said locking bar; said main portion and said pivotally-connected elements being so proportioned and dimensioned that said traction device is movable to an open position in which said device is placed on a tire with said main portion engaging the inner sidewall and the tread of the tire, the axis of said pivotal connection of said locking bar to said link being located, at said open position, outwardly from an imaginary line connecting the point of pivoting engagement of said locking bar and said stop means with the axis of said pivotal connection of said link and said main portion, said link is pivotable inwardly whereby said locking bar, by its engagement with said stop means, pivots said limb inwardly to move said traction device to a tire-clamping closed position where the axis of said pivotal connection of said locking bar to said link is located at a position inwardly from an imaginary line connecting the point of pivoting engagement of said stop means and said locking bar with the axis of said pivotal connection of said link and said main portion, the distance between the tire-clamping surfaces of said device, at said closed position, being less than the uncompressed width of the tire at their points of engagement therewith, said tire being compressed, and, by its resiliency, reactively exerting an outward thrust that is transmitted through said limb, stop means and locking bar to said link to exert a torque on said link tending to move said link and said traction device to closed position and resisting movement of said device to open position, and said device is movable from closed position to open position by an outward pivoting of said link.

3. A traction device for ready mounting on, and detachment from, a wheel having a tire with a tread portion and two sidewalls, said traction device comprising a base having an inner surface engageable with the tread portion of a tire; a cleat joined to the outer surface of said base and extending outwardly therefrom for engagement with a road surface supporting the wheel and tire; two tabs extending from opposite sides of said base for engagement with the tread portion of a tire; an inner limb integrally joined to the inner end of said base and adapted for engagement with the inner sidewall of a tire, a pair of oppositely-extending wings joined to the distal end of said inner limb; an outer limb having one end pivotally connected at the outer end of said base, said outer limb being adapted for engaging the outer sidewall of a tire; a pair of oppositely-extending wings joined to the distal end of said outer limb for engagement with the outer sidewall of a tire; a lug connected to the outer surface of said outer limb adjacent its distal end, said lug having a notch formed therein; a stud having its inner end rigidly connected at the outer end of said base, a generally-S-shaped link having one end pivotally-connected to the outer end of said stud; a locking bar having one end pivotally-connected to said link at a point spaced from the pivotal connection of said link to said stud, the distal end of said locking bar being receivable in said notch; a lever pivotally connected to the distal end of said link, said lever having a manually-engageable arm on one side of its pivot and a camming arm on the other side of its pivot; said elements being so constructed and arranged that said traction device is movable to an open position where the device is placed on a tire with said inner limb engaging the inner sidewall of the tire and said base engaging the tread of the tire, the link is pivotable inwardly whereby said distal end of said locking bar enters said notch and pivots said outer limb inwardly to move said traction device to a closed position where said outer limb engages the outer sidewall of said tire, the distance between the distal ends of said inner and outer limbs at said position being less than the uncompressed width of the tire at their points of engagement therewith, said tire being compressed, and, by its resiliency, reactively exerting an outward thrust on said outer limb that is transmitted through said locking bar to said link to exert a torque on said link tending to move said link toward closed position and resisting movement of said device to open position, said camming arm abutting against said lug at closed position; and whereby, to detach the traction device from a tire, said manually-engageable lever is pivoted outwardly to pivot said link and said locking bar outwardly and disengage said locking bar from said notch.

4. A traction device movable between open and closed positions and having a general J-shape in said closed position, said traction device being adapted for ready mounting on, and detachment from, a wheel having a tire with a thread portion and two sidewalls, said traction device comprising a base having an inner surface engageable with the tread portion of a tire; a cleat joined to the outer surface of said base and extending outwardly therefrom for engagement with a road surface supporting the wheel and tire; two tabs extending from opposite sides of said base for engagement with the tread portion of a tire; an inner limb rigidly joined to the inner end of said base and extending angularly thereto for engagement with the inner sidewall of a tire; a pair of oppositely-extending wings rigidly joined to the distal end of said inner limb; a butt rigidly joined to the end of said base opposite said inner limb and extending angularly thereto, said butt being adjacent the outer sidewall of a tire when the device is in closed position; an outer limb having one end pivotally-connected to the end of said butt, said outer limb having an inner surface adapted for engagement with the outer sidewall of a tire; a pair of oppositely-extending wings joined to the distal end of said outer limb for engagement with the outer sidewall of a tire; a lug rigidly connected to the outer surface of said outer limb adjacent the distal end of said outer limb, said lug having a notch formed therein and a shoulder portion outwardly of said notch; a stud having its inner end rigidly connected to the end of said butt, said stud extending angularly to said butt, a link having its proximal end pivotally-connected to the outer end of said stud, said link having a proximal portion and a distal portion, said link distal position extending angularly to said proximal portion and away from said outer limb; a locking bar having its proximal end pivotally-connected to said link at a point spaced from the pivotal connection of said link to said stud, said locking bar having a nose formed at its distal end, said nose being receivable in said notch of said lug, a lever pivotally connected to the distal end of said link, said lever having a manually-engageable arm on one side of its pivot and a camming arm on the other side of its pivot; said elements being so proportioned and dimensioned that said traction device is movable to an open position in which the device is placed on a tire with said inner limb engaging the inner sidewall of the tire and said base engaging the tread of the tire, the axis of said pivotal connection of said locking bar to said link being located, at said open position, at a position outwardly from an imaginary line connecting the point of pivoting engagement of said nose and said notch with the axis of said pivotal connection of said link and said stud, the link is pivotable inwardly whereby said nose of said locking bar enters said notch and pivots said outer limb inwardly to move said traction device to a tire-clamping closed position where said inner and outer limbs clamp the tire between them and the axis of said pivotal connection of said locking bar to said link is located at a position inwardly from an imaginary line connecting the point of pivoting engagement of said nose and said notch with the axis of said pivotal connection of said link and said stud, the distance between the distal ends of said inner and outer limbs at said closed position being less than the uncompressed width of the tire at their points of engagement therewith, said tire being compressed, and, by its resiliency, reactively exerting an outward thrust on said outer limb that is transmitted through said locking bar to said link to exert a torque on said link tending to move said link, and said traction device, to closed position, and resisting movement of said device to open position.

5. A traction device for easy mounting on, and detachment from, a wheel having a tire with a tread portion and two sidewalls, said traction device comprising a main portion and elements pivotally-connected to said main portion, said main portion including an integral inner limb for engaging the inner sidewall of the tire, a base for engaging the tread of the tire, and a stud formed adjacent the end of the base opposite said inner limb; said pivotally-connected elements including an outer limb pivotally connected to said main portion and engageable with the outer sidewall of the tire, a link pivotally-connected to said stud at a position spaced outwardly a distance from the connection of said outer limb to said main portion, and a locking bar pivotally-connected to said link at a position spaced from the pivotal connection of said link to said stud, said outer limb having stop means thereon for engaging one end of said locking bar; said main portion and said pivotally-connected elements being so proportioned and dimensioned that said traction device is movable to an open position in which said device is placed on a tire with said main portion engaging the inner sidewall and the tread of the tire, the axis of said pivotal connection of said locking bar to said link being located, at said open position, outwardly from an imaginary line connecting the point of pivoting engagement of said locking bar and said stop means with the axis of said pivotal connection of said link and said stud, said link is pivotable inwardly whereby said locking bar, by its engagement with said stop means, pivots said outer limb inwardly to move said traction device to a tire-clamping closed position where the axis of said pivotal connection of said locking bar to said link is located at a position inwardly from an imaginary line connecting the point of pivoting engagement of said stop means and said locking bar with the axis of said pivotal connection of said link and said stud, the distance between the tire-clamping surfaces of said device, at said closed position, being less than the uncompressed width of the tire at their points of engagement therewith, said tire being compressed, and, by its resiliency, reactively exerting an outward thrust that is transmitted through said outer limb, stop means and locking bar to said link to exert a torque on said link tending to move said link and said traction device to closed position and resisting movement of said device to open position, and said device is movable from closed position to open position by an outward pivoting of said link.

6. A traction device for easy mounting on, and detachment from, a wheel having a tire with a tread portion and two sidewalls, said traction device comprising a main portion and elements pivotally-connected to said main portion, said main portion including an integral inner limb for engaging the inner sidewall of the tire, a base for engaging the tread of the tire, and a stud formed adjacent the end of the base opposite said inner limb said pivotally-connected elements including an outer limb pivotally-connected to said main portion and engageable with the outer sidewall of the tire, a link pivotally-connected to said stud at a position spaced outwardly a distance from the connection of said outer limb to said main portion, and a locking bar pivotally-connected to said link at a position spaced from the pivotal connection of said link to said stud, said locking bar being formed with a nose at its distal end, said outer limb having stop means formed therein, said stop means having a notch for receiving the nose of said locking bar; said main portion and said pivotally-connected elements being so proportioned and dimensioned that said traction device is movable to an open position in which said device is placed on a tire with said main portion engaging the inner sidewall and the tread of the tire, the axis of said pivotal connection of said locking bar to said link being located, at said open position, outwardly from an imaginary line connecting the point of pivoting engagement of said locking bar nose and said stop means with the axis of said pivotal connection of said link and said stud, said link is pivotable inwardly whereby said locking bar, by its engagement with said stop means, pivots said outer limb inwardly to move said traction device to a tire-clamping closed position where the axis of said pivotal connection of said locking bar to said link is located at a position inwardly from an imaginary line connecting the point of pivoting engagement of said stop means and said locking bar nose with the axis of said pivotal connection of said link and said stud, the distance between the tire-clamping surfaces of said device, at said closed position, being less than the uncompressed width of the tire at their points of engagement therewith, said tire being compressed, and, by its resiliency, reactively exerting an outward thrust that is transmitted through said outer limb, stop means and locking bar to said link to exert a torque on said link tending to move said link and said traction device to closed position and resisting movement of said device to open position, and said device is movable from closed position to open position by an outward pivoting of said link.

7. A traction device for easy mounting on, and detachment from, a wheel having a tire with a tread portion and two sidewalls, said traction device comprising a main portion and elements pivotally-connected to said main portion, said main portion including an integral inner limb for engaging the inner sidewall of the tire, a base for engaging the tread of the tire, and a stud formed adjacent the end of the base opposite said inner limb; said pivotally-connected elements including an outer limb pivotally-connected to said main portion and engageable with the outer sidewall of the tire, a link pivotally-connected to said stud at a position spaced outwardly a distance from the connection of said outer limb to said main portion, said link including a proximal portion adjacent its pivotal connection to said stud and a distal portion extending at an angle to said proximal portion and away from said outer limb, a lever rotatably connected, at a point between its ends, to the distal end of said link, said lever including a camming arm and a manually-engageable arm on opposite sides of its rotatable connection, and a locking bar pivotally-connected to said link at a position spaced from the pivotal connection of said link to said stud, said outer limb having stop means thereon for engaging one end of said locking bar, said stop means having a shoulder to serve as a fulcrum engaged by said lever camming arm; said main portion and said pivotally-connected elements being so proportioned and dimensioned that said traction device is movable to an open position in which said device is placed on a tire with said main portion engaging the inner sidewall and the tread of the tire, the axis of said pivotal connection of said locking bar to said link being located, at said open position, outwardly from an imaginary line connecting the point of pivoting engagement of said locking bar and said stop means with the axis of said pivotal connection of said link and said stud, said link is pivotable inwardly whereby said locking bar, by its engagement with said stop means, pivots said outer limb inwardly to move said traction device to a tire-clamping closed position where the axis of said pivotal connection of said locking bar to said link is located at a position inwardly from an imaginary line connecting the point of pivoting engagement of said stop means and said locking bar with the axis of said pivotal connection of said link and said stud, the distance between the tire-clamping surfaces of said device, at said closed position, being less than the uncompressed width of the tire at their points of engagement therewith, said tire being compressed, and, by its resiliency, reactively exerting an outward thrust that is transmitted through said outer limb, stop means and locking bar to said link to exert a torque on said link tending to move said link and said traction device to closed position and resisting movement of said device to open position, and said device is movable from closed position to open position by an outward pivoting of said lever and said link.

References Cited in the file of this patent
UNITED STATES PATENTS

| | | |
|---|---|---|
| 2,467,654 | Boje | Apr. 19, 1949 |
| 3,047,037 | Frederick | July 31, 1962 |